US008831443B2

(12) United States Patent
Nomura

(10) Patent No.: US 8,831,443 B2
(45) Date of Patent: Sep. 9, 2014

(54) IMAGE FORMING APPARATUS AND METHOD FOR CALIBRATING DENSITY AND COLOR

(75) Inventor: Yoshihisa Nomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 13/595,526

(22) Filed: Aug. 27, 2012

(65) Prior Publication Data

US 2013/0058662 A1 Mar. 7, 2013

(30) Foreign Application Priority Data

Sep. 5, 2011 (JP) ................................. 2011-193283

(51) Int. Cl.
*G03G 15/00* (2006.01)
*H04N 1/401* (2006.01)

(52) U.S. Cl.
CPC ...... *G03G 15/55* (2013.01); *G03G 2215/00067* (2013.01); *G03G 15/50* (2013.01); *G03G 2215/00616* (2013.01); *H04N 1/401* (2013.01)
USPC .......................................................... 399/15

(58) Field of Classification Search
CPC .............. G03G 15/00; G03G 15/5062; G03G 2215/00067; G03G 15/55
USPC .......................................................... 399/15
See application file for complete search history.

(56) References Cited

U.S. PATENT DOCUMENTS

| | | | | | |
|---|---|---|---|---|---|
| 4,661,843 | A | * | 4/1987 | Sekizawa et al. | 358/520 |
| 4,922,335 | A | * | 5/1990 | Outa et al. | 358/506 |
| 5,512,986 | A | * | 4/1996 | Toyomura et al. | 399/60 |
| 5,697,012 | A | * | 12/1997 | Sasanuma et al. | 399/49 |
| 5,805,213 | A | * | 9/1998 | Spaulding et al. | 348/222.1 |
| 5,880,859 | A | * | 3/1999 | Hiromatsu | 358/514 |
| 5,887,223 | A | * | 3/1999 | Sakai et al. | 399/60 |
| 6,115,561 | A | * | 9/2000 | Fukushima | 399/49 |

(Continued)

FOREIGN PATENT DOCUMENTS

| | | | | |
|---|---|---|---|---|
| JP | 2006-165864 | * | 6/2006 | ............... B41J 2/525 |
| JP | 2006-165864 | A | 6/2006 | |
| JP | 2008-298854 | * | 12/2008 | ............. G03G 15/00 |
| JP | 2008-298854 | A | 12/2008 | |

*Primary Examiner* — Clayton E Laballe
*Assistant Examiner* — Kevin Butler
(74) *Attorney, Agent, or Firm* — Fitzpatrick, Cella, Harper & Scinto

(57) ABSTRACT

According to the embodiments of the invention, the problem to be solved is whether errors have occurred for color sensors for calibrating density and color or their corresponding reference plates. At step S103, it is determined whether the difference is larger than a predefined threshold. If so, the sensors are determined abnormal; otherwise, it is normal. At step S111, color sensors 50*a, b, c,* and *d* read the density of recording medium 11 on at least one of its coordinates, compares the readings of sensors determined abnormal with that of sensors determined normal, and determines whether the difference obtained at step S112 is within the predefined threshold. At step S114, for color sensors determined abnormal at step S103, an abnormity alarm message is displayed on a UI as shown in FIG. 8 or sent to the user via e-mail.

12 Claims, 16 Drawing Sheets

(56) References Cited

U.S. PATENT DOCUMENTS

| | | | |
|---|---|---|---|
| 6,173,133 B1* | 1/2001 | Donaldson et al. | 399/58 |
| 6,236,827 B1* | 5/2001 | Hada | 399/301 |
| 7,751,735 B2* | 7/2010 | Takahashi | 399/49 |
| 8,009,332 B2* | 8/2011 | He et al. | 358/406 |
| 8,320,023 B2* | 11/2012 | Takahashi et al. | 358/3.1 |
| 2008/0145089 A1* | 6/2008 | Takahashi | 399/74 |
| 2008/0226316 A1* | 9/2008 | Koshimura et al. | 399/49 |
| 2010/0002266 A1* | 1/2010 | Takahashi et al. | 358/3.06 |
| 2012/0050771 A1* | 3/2012 | Sakatani | 358/1.9 |
| 2013/0004188 A1* | 1/2013 | Suzuki | 399/39 |
| 2013/0058662 A1* | 3/2013 | Nomura | 399/15 |
| 2013/0162998 A1* | 6/2013 | Furuta | 356/402 |

* cited by examiner

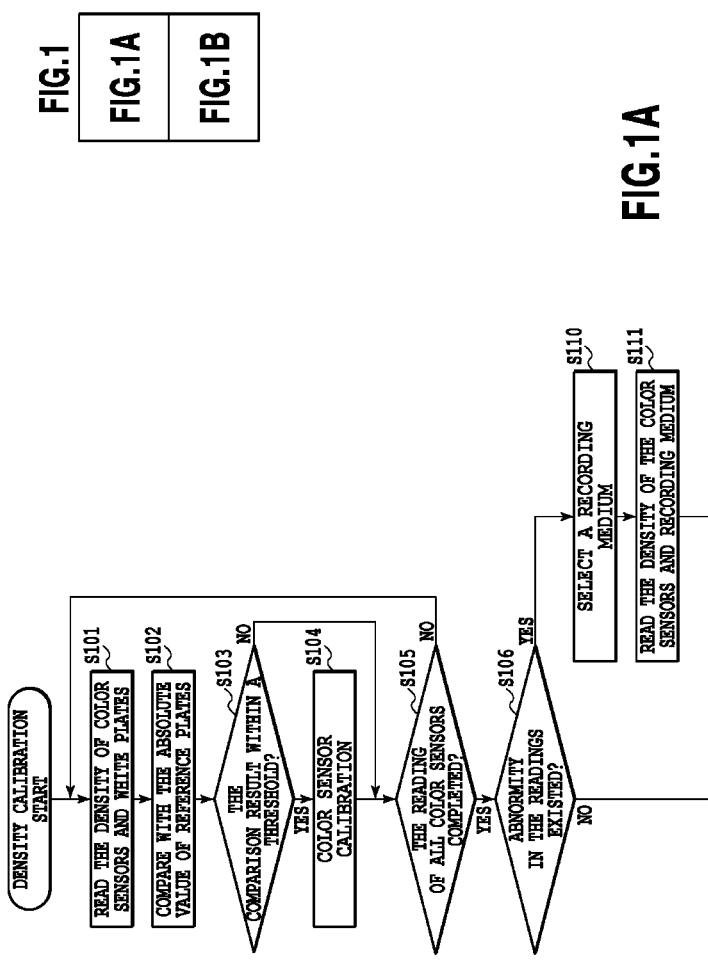

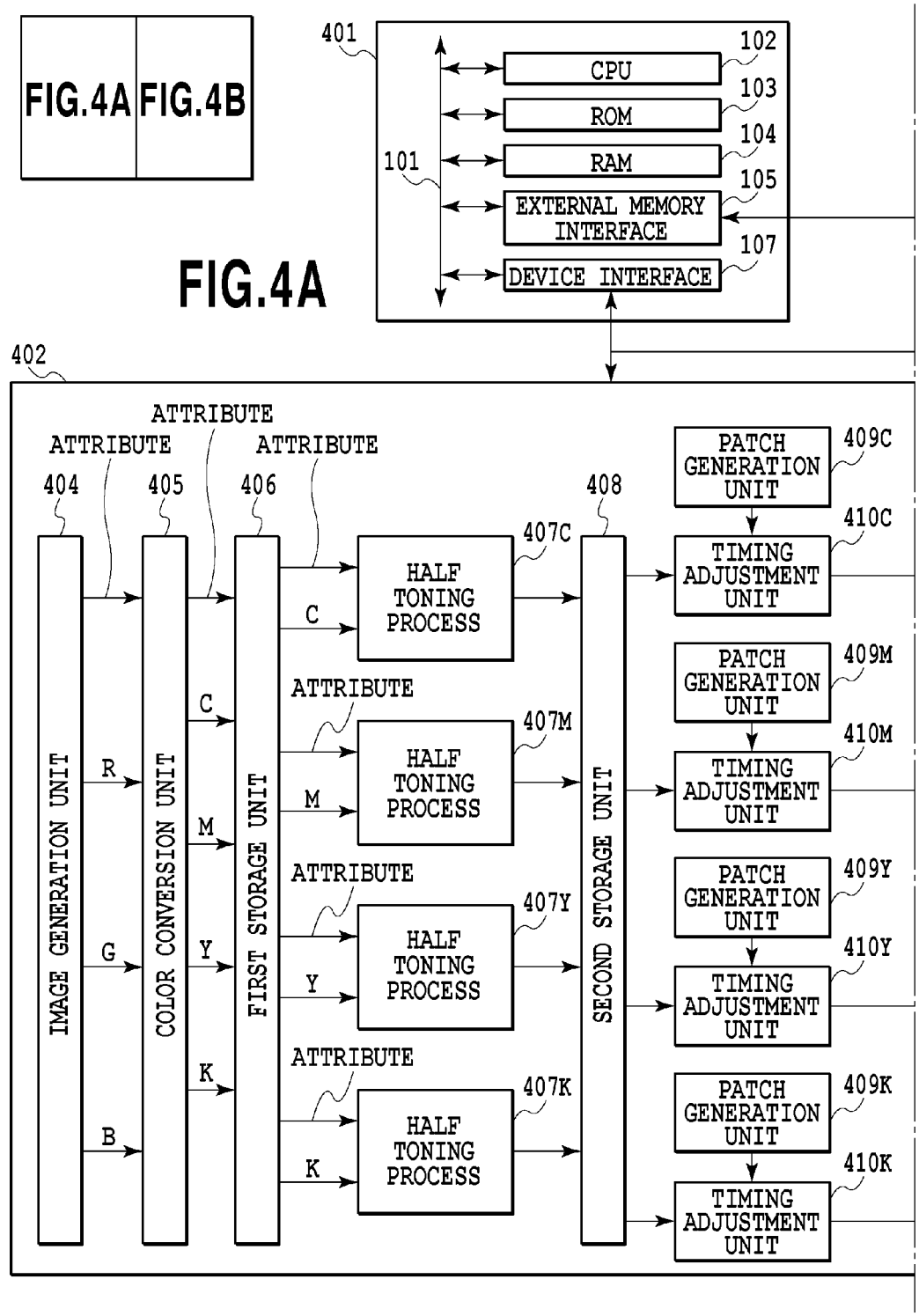

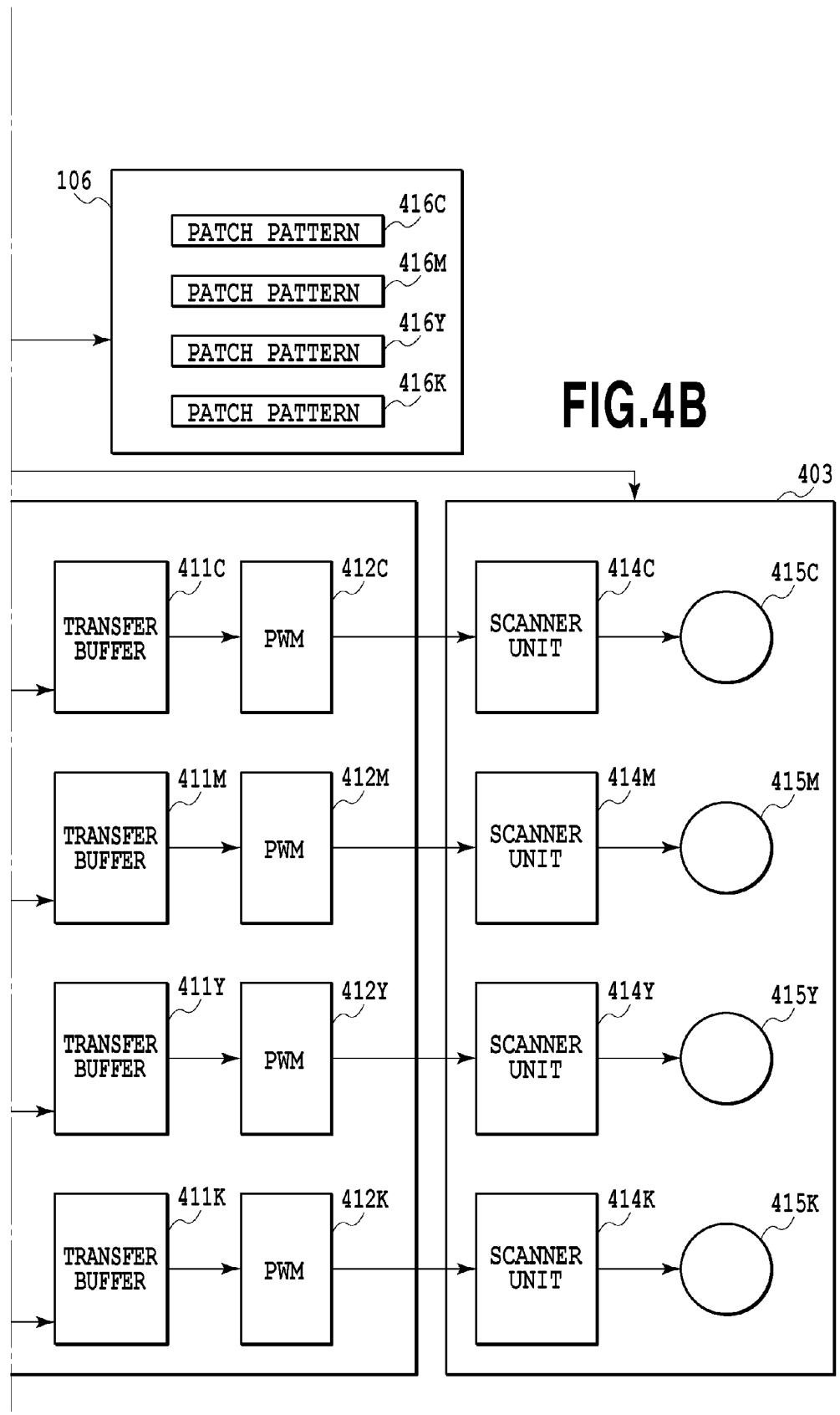

FIG.12

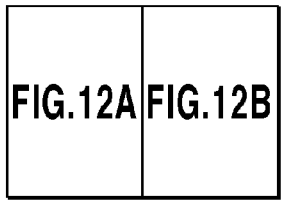

FIG.12A

| CASE | THE NUMBER OF SENSORS | STATUS | DENSITY REFERENCE PLATE READINGS THE NUMBER OF DETECTED ABNORMITY |
|---|---|---|---|
| a | MULTIPLE | N DENSITY REFERENCE PLATES CONTAMINATED | N |
| b | MULTIPLE | N SENSORS CONTAMINATED | N |
| c | MULTIPLE | L DENSITY REFERENCE PLATES AND M SENSORS CONTAMINATED (L+M=N) | L+M |
| d | MULTIPLE | M DENSITY REFERENCE PLATES CONTAMINATED (M<N) | M |
| e | MULTIPLE | L SENSORS CONTAMINATED (L<N) | NONE |
| f | MULTIPLE | L DENSITY REFERENCE PLATES AND M SENSORS CONTAMINATED (L+M<N) | L+M |
| g | SINGLE | DENSITY REFERENCE PLATES CONTAMINATED | ONE |
| h | SINGLE | SENSORS CONTAMINATED | ONE |

○: TARGETED FOR COMPARISON ×: NOT TARGETED FOR COMPARISON

FIG.12B

| RECORDING MEDIUM READINGS THE NUMBER OF DETECTED ABNORMITY | TARGET FOR COMPARISON | | |
|---|---|---|---|
| | READINGS OF OTHER SENSORS | PREVIOUS READINGS | PREDICTED VALUE |
| NONE | × | ○ | ○ |
| N | × | ○ | ○ |
| L | × | ○ | ○ |
| NONE | ○ | ○ | ○ |
| L | ○ | ○ | ○ |
| L | ○ | ○ | ○ |
| NONE | × | ○ | ○ |
| ONE | × | ○ | ○ |

IMAGE FORMING APPARATUS AND METHOD FOR CALIBRATING DENSITY AND COLOR

This application claims the benefit of Japanese Patent Application No. 2011-193283, filed Sep. 5, 2011, which is hereby incorporated by reference herein in its entirety.

BACKGROUND OF THE INVENTION

1. Field of the Invention

This invention relates to an image forming apparatus and a method for calibrating density and color, and in particular, to an image forming apparatus such as a copy machine or printer and a method for calibrating density and color.

2. Description of the Related Art

Electrophotography is known as one of the image recording schemes used for an image forming apparatus such as a copy machine or printer. With electrophotography, latent images are first formed on a photosensitive drum using laser beam and then the image is developed with electrically-charged coloring material (hereinafter also referred to as "toner"). The image developed with the toner is then transferred and fixed onto a transfer paper and recorded as a final image. Recently, there are especially more tandem electrophotographic image forming apparatuses that have as many developing machines and photosensitive drums as toner colors and they sequentially transfer different color images into an image conveyor belt and a recording medium.

For the tandem image forming apparatuses, a known method prints specific patterns such as gradation patterns onto a recording medium such as paper after a warm-up process during startup in order to improve the stability of image quality. More specifically, the method reads printed gradation patterns with an image reading apparatus such as a scanner and then adjusts image forming conditions such as gamma calibration based on the patterns. However, one problem is the adhesion characteristic of the development toner against the potential of a photosensitive drum could change over time. As a result, the optimum image formation condition might not be maintained. To overcome the problem, traditionally, density calibration using the relationship between the potential data and density is performed to form monochromatically developed patches of C, M, Y, and K onto the non-image forming area of the photosensitive drum. The patches formed are read by a photo sensor. The output obtained by the photo sensor is converted with a predefined density conversion table, which value is then used for the density control of a LUT for one-dimensional gradation correction using gamma-calibration.

In another field of recent electrophotographic image forming apparatuses, especially in the field of quick printing industry, there is a need for much higher image quality. The color balance of a color image forming apparatus often changes according to process conditions such as laser exposure amount onto a photo conductor and development bias, and environment or chronological changes due to the heating of a fixing unit or the adjustment of pressurization temperature. For such changes, the calibration performed for the density control as described above would not be enough because even if the monochromatic gradation characteristics are adjusted with the above LUT for a one-dimensional gradation correction, a "mixed color" that requires a plurality of CMY toners such as red, green, blue, and gray built from CMY produces non-linear differences depending on the type of the printer, causing difficulty in ensuring that correct colors will be produced. To overcome the problem, a technique is proposed that creates and outputs a chart with mixed colors in a range that a printer can reproduce, and measures colors with a scanner or color measuring unit, compares the measured color with a target value, and finally produces a corrected value (e.g., see, Japanese Patent Laid-Open No. 2006-165864).

In addition, another technique is proposed that focuses on a destination profile in an ICC profile and modifies the destination profile to correct color differences in mixed colors. Here, the ICC profile refers to data defined by ICC (International Color Consortium), which is used for converting colors. First, the technique outputs a chart of mixed colors with a printer, and then measures those colors with a scanner or a color measuring unit. The mixed colors can be corrected by calculating the difference between the measurement result and a target value and updating a three-dimension LUT (destination profile) that converts a device independent color space ($L^*a^*b^*$) of the ICC profile into a device dependent color space (CMYK). The $L^*a^*b^*$ is one of the device independent color spaces, in which $L^*$ represents brightness and $a^*b^*$ represents color phase and chroma, respectively. It has been examined that, utilizing this principle, mixed color patches on a recording medium are read by color sensors arranged on a paper conveyor path between a fixing area and an ejecting area to control density or color. Furthermore, a reference plate for calibrating the color sensors (hereinafter also referred to as "white plate") may be arranged in front of each of the color sensors in order to calibrate the color sensors to improve the accuracy of their readings.

However, even with such a technique, when the color sensors or white plates are placed on the paper conveyor path between the fixing area and ejecting area within the image forming apparatus, the sensors and plates may be contaminated due to the exfoliation of tonners or dusts. In this case, a serviceman will be notified of the error and he must clean and replace both of the sensors and the plates. In handling such an error, if it is not clear which of the sensors or plates are contaminated, the serviceman will be required to replace and clean up both the sensors and plates, needing more time to perform replacement tasks and arrange parts necessary for the replacement resulting in frequent down times. A technique to overcome the problem is disclosed in Japanese Patent Laid-Open No. 2008-298854 in which an optical sensor reads optical density or the optical reflection characteristic of detection toner images formed on an intermediate transferring body. The technique of Japanese Patent Laid-Open No. 2008-298854 then forms reference image patterns of white coloring materials on the intermediate transferring body and corrects the optical sensor based on the reference image patterns. With this, it can be determined whether the color sensor or the intermediate transferring body is contaminated by reading the reference image patterns. In addition, any reference plates for calibration are not required. Furthermore, the color detection accuracy of the sensors can be improved for better image density control.

However, in Japanese Patent Laid-Open No. 2008-298854 above, a plurality of reference image patterns is formed using toners, the density of which is used to determine whether it is the color sensors or the intermediate transferring body that is contaminated. Therefore, considerable toners will be consumed accordingly. Furthermore, another problem arises in that reading errors of the color sensors will be caused leading to the degradation in the calibration accuracy of density and color because calibration using the reference plates is not performed at the initial stage.

SUMMARY OF THE INVENTION

The present invention relates to an image forming apparatus to solve the above problems and has a plurality of color sensors; a reference plate referenced for adjusting output characteristics of the plurality of color sensors; a reading means for causing a first color sensor of the plurality of color sensors and a second sensor other than the first color sensor to read the density of the recording medium when, as a result that the first color sensor among the plurality of color sensors obtains readings of the reference plate, the difference between the predefined absolute value of the reference plate and readings of the reference plate read by the first color sensor is larger than a predefined threshold, wherein the difference between the predefined absolute value and readings of the reference plate read by the second color sensor is smaller than the threshold; a determination means for determining that there exists abnormality in the reference plate when the difference between readings of the recording medium read by the first color sensor and that read by the second color sensor is smaller than a predefined threshold; and a notification means for notifying the determination result.

According to various embodiments of the present invention, the identification of error factors in either of the sensors or reference plates is possible without wasting toners in handling errors during the calibration of density and color so that maintainability of the image forming apparatus can be improved. In addition, color sensors can accurately correct the density and color when errors of the reference plates occur so that down times of the image forming apparatus can be reduced.

Further features of the present invention will become apparent from the following description of exemplary embodiments (with reference to the attached drawings).

BRIEF DESCRIPTION OF THE DRAWINGS

FIG. 1 is a view showing a relationship between FIG. 1A and FIG. 1B;

FIG. 1A is a flowchart illustrating exemplary calibration process of density and color in accordance with embodiments 1 and 2;

FIG. 4 is a view showing a relationship between FIG. 4A and FIG. 4B;

FIG. 4A is a block diagram illustrating components relevant in creating electrostatic latent images in accordance with embodiments 1 and 2;

FIG. 4B is a block diagram illustrating components relevant in creating electrostatic latent images in accordance with embodiments 1 and 2;

FIG. 12 is a view showing a relationship between FIG. 12A and FIG. 12B;

FIG. 12A is a table categorizing contamination causes in accordance with embodiment 2;

FIG. 12B is a table categorizing contamination causes in accordance with embodiment 2.

DESCRIPTION OF THE EMBODIMENTS

Figure 1B:
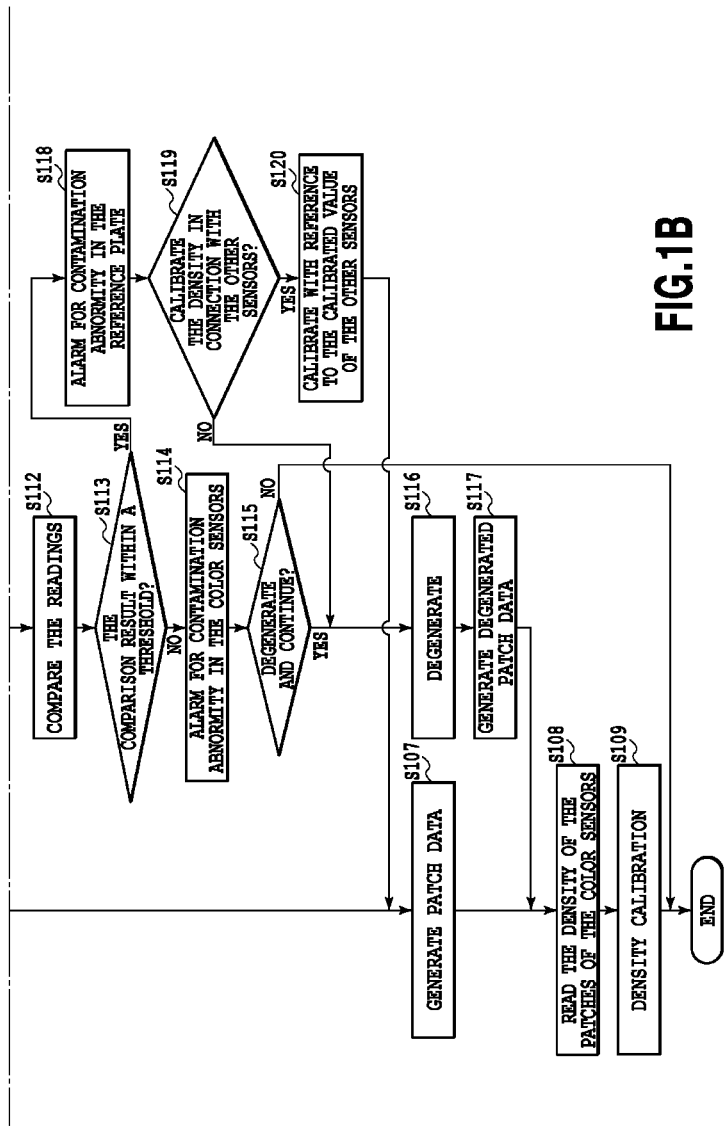
FIG. 1B is a flowchart illustrating exemplary calibration process of density and color in accordance with embodiments 1 and 2.

Various embodiments of the invention will now be described with reference to the accompanying drawings. FIG. 4 shows a block diagram illustrating components relevant in creating electrostatic latent images in electrophotographic color image forming apparatuses of embodiments 1 and 2 described below. The color image forming apparatus includes an image forming unit 403 and an image processing unit 402. The image processing unit 402 creates bitmap image information whereas the image forming unit 403 forms images on a recording medium based on the created image information.

A controller 401 is connected to a scanner (not shown) or an image input device, and a printer 402 or an image output device. The controller 401 can also input or output images or device information through a connection to networks such as LAN or public line (not shown). A system bus 101 includes, but not limited to, a high-speed bus such as PCI bus or IEEE 1394. Here, for simplicity in explanation, FIG. 4 shows only devices relating to the embodiments. For example, it will be obvious to those skilled in the art that the system bus 101 may be connected to a network or scanner interface necessary for MFP (not shown).

A CPU 102 serves as a controller for controlling the entire digital copy machine. ARAM 104 is used as a system work memory for operating the CPU 102 and also as an image memory for temporally storing image data. A ROM 103 is used as a boot ROM and stores boot programs of the digital copy machine. An external memory interface 105 is the external memory interface for HDD, for example, and can read/write data stored in an external storage device 106.

The external storage device 106 is an external memory such as HDD, DDR3 memory, and NAND flash memory and stores system software, image data, and personal data such as address book, as well as patch patterns required by the embodiments. A device interface 107 can communicate with the image processing unit 402 and image forming unit 403 to issue print execution commands and transfer image data and can read engine status.

The processing of the image processing unit 402 in the color image forming apparatus will now be described. An image generation unit 404 generates printable raster image data based on print data received from computer devices (not shown), and outputs, for each pixel, RGB data and attribution data that specifies data attributes of the pixel. Here, the image generation unit 404 may comprise a reading unit within the color image forming apparatus and receives the image data not from the computer devices but from the reading unit. The term reading unit as used herein refers to, for example, a device that reads images with a CCD (Charged Couple Device) or CIS (Contact Image Sensor) and outputs their signals. The color image forming apparatus may also include a processing unit for performing predefined image tasks for read image data. Alternatively, the apparatus may read from another reading unit via an interface (not shown) and may not have the reading unit within the color image device.

A color conversion means 405 converts the above RGB data into CMYK data in a manner consistent with toner colors of the image processing unit 402. In addition, color conversion is performed using a 4D-LUT for correcting mixed colors. Here, the 4D-LUT is defined as a four dimensional LUT that converts a CMYK into a different one. The 4D-LUT can correct mixed colors created by using a plurality of toners. The details of generating the 4D-LUT for correcting mixed colors will be described below. The CMYK and attribution data are stored in a bitmap memory 406. A first storage unit 406, a bitmap memory included within the image processing unit 402, temporally stores raster image data for the printing process. Here, the first storage unit 406 may be a page memory storing image data of a page or a band memory storing multiple line data.

Half toning process units 407C, 407M, 407Y, and 407K perform gamma calibration and half toning for attribution data and each color's data output from the first storage unit 406. The gamma calibration is performed to calibrate the density to an ideal gradation characteristic. The specific configuration of the half toning process units includes screen or error diffusion processing. The screen processing performs N-ary encoding for input image data using a plurality of predefined dithering matrices, whereas the error diffusion process performs the N-ary encoding for the input image data by comparing the data with predefined thresholds and diffuses the difference therein into surrounding pixels to be N-ary encoded.

A second storage unit 408 is included within the image formation apparatus and stores N-ary data encoded by the half toning process unit 407 (407C, 407M, 407Y and 407K). Patch pattern generation units 409C, 409M, 409Y, and 409K each correspond to each color and generate patch patterns whose density and color need to be corrected, and transfer the patterns to a transfer buffer as described below. It should be noted that patch patterns for density and color calibration fixed and formed on the recording medium 11 by the patch pattern generation unit 409 include a number of patterns such as a K gray gradation patch with close chromaticities, a CMY process gray gradation patch, or a gradation patch of a single color of CMYK, and are used for their own purpose. An optimum patch pattern is selected by the controller 401 and generated from screen patterns preliminarily stored in the external storage unit 106. Alternatively, rather than reading from the storage unit, an internal logic may prepare and generate the optimum patch pattern. The patch patterns are generated at a position and size readable by color sensors, as described below.

Timing adjustment units 410C, 410M, 410Y, and 410K are configured to synchronize the timings of outputting N-ary encoded data from the storage unit 408 and data from the patch pattern generation unit 409 with the operation of the image forming unit 403. Transfer buffers 411C, 411M, 411Y, and 411K temporally retain output data of the timing adjustment unit 410.

A pulse width modulation unit (PWM: Pulse Width Modulation) 412 converts image data for each color output from the transfer buffer 411 into the exposure time of laser light. Converted image data is output from a printing unit 415 of the image forming unit 403 such that the image data is exposed by printing units 414C, 414M, 414Y, and 414K to form a patch pattern image. Output patch pattern data 415C, 415M, 415Y, and 415K are used for correcting density and color. Various pattern data are provided on the external storage unit 106 corresponding to the number of gradations and half toning processes performed by the half toning process units 407C, 407M, 407K. Those pattern data are read into the patch pattern generation units 409C, 409M, 409Y, and 409K of the image processing unit 402 through the device interface 107.

It should be noted that although the external storage unit 106, the first storage unit 406, the second storage unit 408, and the transfer buffer 411 are described as separate components herein, a common storage unit may be provided within or external to the image forming apparatus.

The image forming unit 403 generates exposure light depending on the exposure time calculated by the image processing unit 402 and then forms and develops electrostatic latent images to create single color tonner images. In addition, the unit overlays the toner images on top of each other to create mixed color toner images and transfer the mixed color toner images to the recording medium 11 of FIG. 6 to fix the mixed color toner images on the recording medium.

Figure 5:
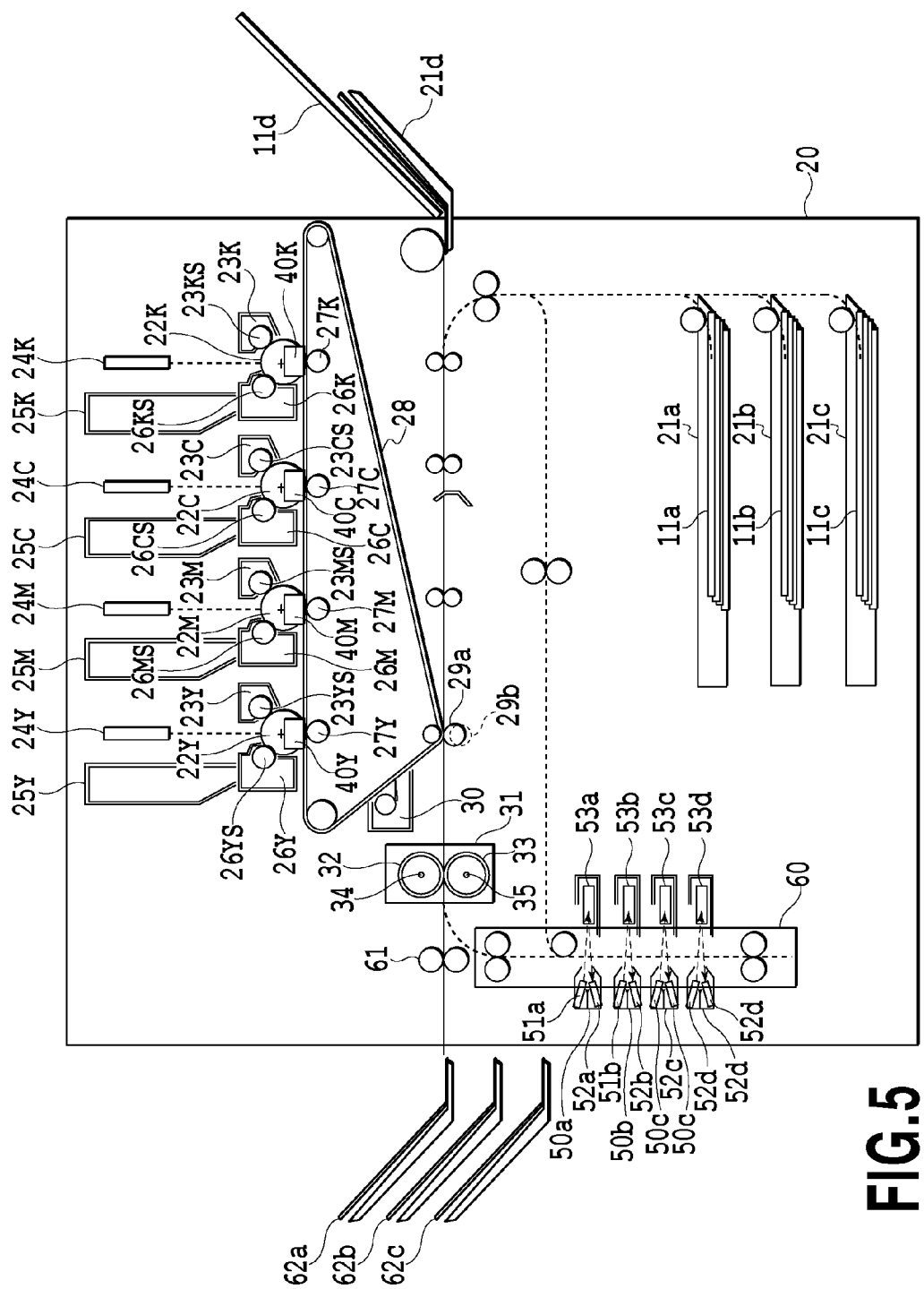
FIG. 5 is a sectional view of an image forming apparatus in accordance with embodiments 1 and 2.
Figure 6:
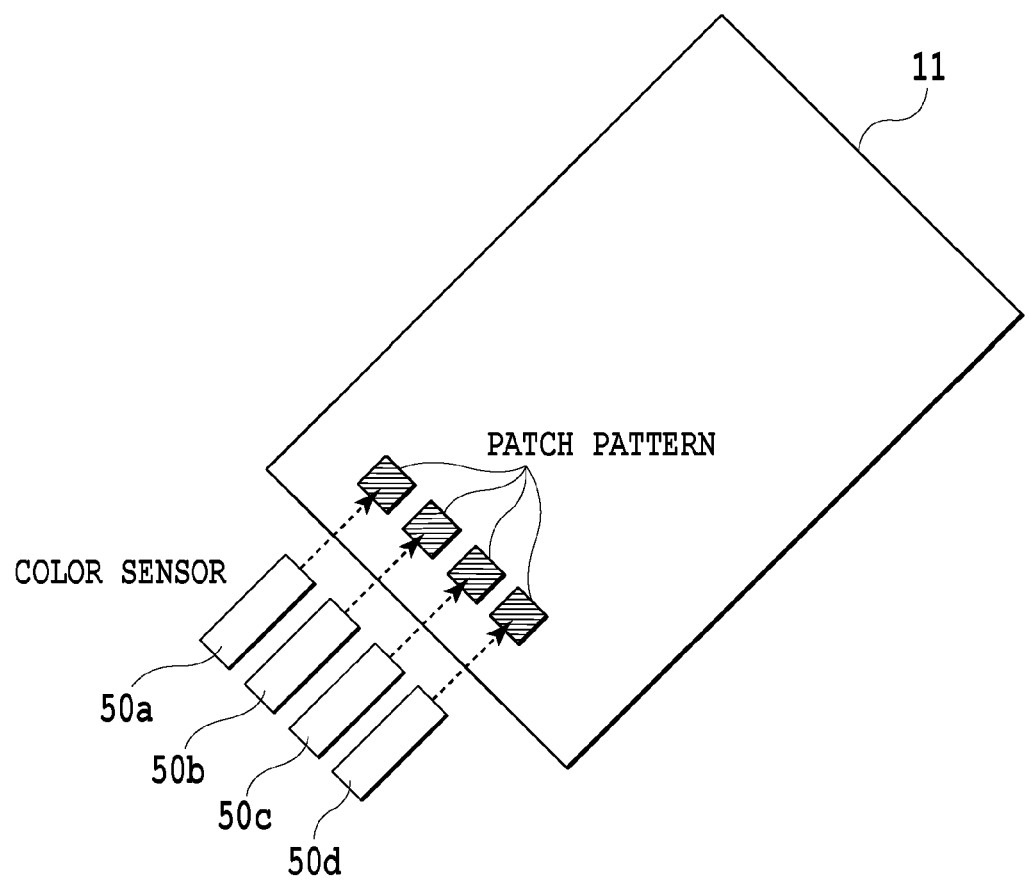
FIG. 6 is a diagram illustrating components of a color sensor of an image forming apparatus in accordance with embodiments 1 and 2.
Figure 7:
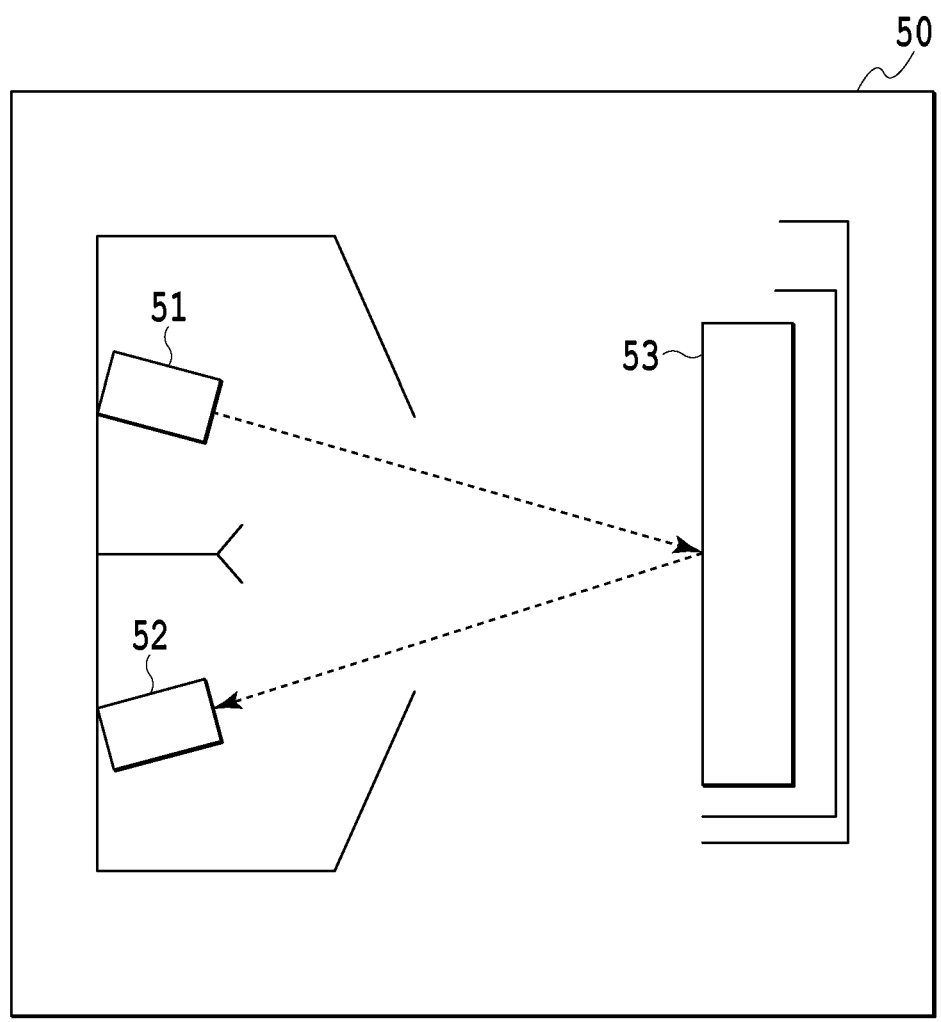
FIG. 7 is a diagram illustrating components of a color sensor of an image forming apparatus in accordance with embodiments 1 and 2.

FIG. 5 is a sectional view of a tandem color image forming apparatus 20, which is an example of an electrophotography color image forming apparatus 20, that employs an intermediate transferring body 28, whereas FIGS. 6 and 7 illustrate components of a color sensor of the tandem color image forming apparatus 20. The operation of the image forming unit 403 of the electrophotography color image forming apparatus 20 will be described with reference to FIGS. 5 to 7. As a charging means, four injection chargers 23Y, 23M, 23C, and 23K for charging photosensitive members 22Y, 22M, 22C, and 22K for each color of Y, M, C, and K are provided with sleeves 23YS, 23MS, 23CS, and 23KS, respectively.

Photosensitive drums 22Y, 22M, 22C, and 22K are rotated by a driving force transmitted from drive motors 40Y, 40M, 40C, and 40K. The drive motors rotate the photosensitive drums 22Y, 22M, 22C, and 22K counterclockwise in accordance with an image forming operation, for example. As exposure means, scanner units 24Y, 24M, 24C, and 24K are configured to selectively irradiate with exposure light and expose the photosensitive drums 22Y, 22M, 22C, and 22K, respectively, to form electrostatic images on the surfaces of the drums. The scanner units 24Y, 24M, 24C, and 24K in accordance with the embodiment may include, but not limited to, multi-laser beams that can irradiate the drums with a plurality of exposure light.

Four developing devices 26Y, 26M, 26C, and 26K are provided as developing means to perform development for each color of Y, M, C, and K, respectively, in order to visualize the above electrostatic images, each of which are provided with sleeves 26YS, 26MS, 26CS, and 26KS. It should be noted that although the respective developing devices 26 of the embodiment are detachable in view of maintainability, for example, they are not limited to such configuration.

An intermediate transferring body 28 as a transferring means rotates clockwise so that the intermediate transferring body 28 can transfer single-color toner images from the photosensitive drum 22. The photosensitive drums 22Y, 22M, 22C, and 22K and primary transferring rollers 27Y, 27M, 27C, and 27 opposing drums rotate to transfer the single-color toner images. Applying appropriate bias voltage to the primary transferring roller 27 as well as differentiating the rotating speed of the photosensitive drum 22 from that of the intermediate transferring body 28 can efficiently transfer the single-color toner images on the intermediate transferring body 28. This mechanism is referred to as primary transfer.

In addition, the transferring means overlays the single-color toner images on the intermediate transferring body 28 to create mixed-color toner images, which are then conveyed to the secondary transferring roller 29 with the rotation of the intermediate transferring body 28.

Furthermore, recording media 11*a, b, c,* and *d* are each nipped and conveyed from feed trays 21*a, b, c,* and *d* to the secondary transferring roller 29, respectively, where the mixed-color toner images on the intermediate transferring body 28 are transferred onto the recording media 11. Applying appropriate bias voltage to the secondary transferring roller 29 transfers toner images charged with static electricity of the toner to the roller 29. This process is referred to as second transfer. While transferring the mixed-color toner images onto the recording medium 11, the secondary transferring roller 29 abuts against the medium 11 at the position 29*a*, and then is spaced apart from the medium 11 to the position 29*b*.

A fixing roller 32 for heating the recording medium 11 and a pressure roller 33 for bringing the medium 11 into press contact with the fixing roller 32 are provided such that a fixing means can melt and fix the mixed-color toner images transferred to the medium 11 thereon. The fixing roller 32 and the pressure roller 33 are formed into hollow shapes and have heaters 34 and 35 built therein, respectively. A fixing device 31 conveys the recording medium 11 with the mixed-color toner images using the fixing roller 32 and the pressure roller 33, as well as applies heat and pressure to the medium 11 so that the toner is fixed onto the medium 11.

For two-side printing, the recording medium 11 having toner fixed thereto is conveyed to the conveying unit 60 and ejected to the ejection trays 62*a, b,* and *c* by the ejection roller 61, thereby ending the image forming operation. Alternatively, the medium 11 may be nipped and conveyed to the secondary transferring roller 29 again through the inside conveyor path. For one-side printing, the medium is simply ejected to the ejection trays 62*a, b,* and *c*, thereby ending the image forming operation.

A cleaning unit 30 cleans the toner remaining on the intermediate transferring body 28. The waste toner produced after transferring the mixed-color toner image of four colors formed on the body 28 onto the recording medium 11 is accumulated in a clearer container (not shown).

The color sensors 50*a, b, c,* and *d* comprise white LEDs 51*a, b, c,* and *d* and charge accumulation sensors 52*a, b, c, d* with RGB on-chip filters as shown in FIG. 7. As illustrated in FIGS. 6 and 7, light from the LEDs 51*a, b, c,* and *d* enters the recording medium 11 at an angle of 45 degrees on which fixed patches are formed, and the sensors 52*a, b, c,* and *d* detect from the medium 11 the intensity of diffused reflection light in the direction of 0 degree. Light receiving units of the sensors 52*a, b, c,* and *d* have independent pixels for R, G, or B. The sensors 52*a, b, c,* and *d* may also be photo diodes. The sensors may be formed by arranging some sets of RGB pixels. In addition, the incident and reflection angle may be set to 0 and 45 degrees, respectively. Further, the sensors may be configured with LEDs emitting three colors of RGB and sensors with no filter.

Color sensors 50*a, b, c,* and *d* are arranged toward an image forming surface of the recording medium 11 on a recording medium conveyor path between a fixing part and ejection part inside the image forming apparatus. The sensors detect the color of fixed mixed-color patches formed on the recording medium 11 and output its RGB value. Such arrangement inside the image forming apparatus allows for the automatic detection of the patch color before ejecting fixed images to the ejection part. In FIG. 5, the sensors are arranged in a manner that they can read the recording medium 11 passing a two-sided conveyor path 60.

Reference plates (white plates) 53*a, b, c,* and *d* have XYZ absolute values. The color sensors 50*a, b, c,* and *d* are arranged in a manner that they can obtain the chromaticity of the reference plates 53*a, b, c,* and *d* located in front of the sensors or the density from the chromaticity when the recording medium 11 is not on the two-sided conveyor path 60. It should be noted that although FIG. 6 illustrates the four pairs of color sensors 50*a, b, c,* and *d* and reference plates 53 as described below, any number of pairs of color sensors and reference plates may be arranged such that the chromaticity or density of the recording medium 11 can be obtained in parallel.

In addition, the color sensors 50*a, b, c,* and *d* can obtain the absolute values (i.e., the absolute chromaticity or the absolute density calculated from the absolute chromaticity) of the recording medium 11 by reading the reference plates 53*a, b, c,* and *d*. The RGB values output from patch patterns generated at the patch pattern generation units 409 generally change with the degree of gradation in a continuous manner. Accordingly, the mathematical processing such as linear or quadratic approximation for the RGB output values of a given gradation degree and an adjacent one can predicate RGB output values between detected gradation degrees. The color sensors 50*a, b, c,* and *d* convert the patch data into electrical signals, which are then subject to the analog/digital conversion and sent in L*a*b* to the CPU 102 of a controller via the device interface 107. The CPU 102 categorizes the measured data into a chromatic and achromatic color.

The categorization above may preliminarily record information about whether the patch data is chromatic or achromatic on generating the data, or may analyze the readings of the patch data or measured data to determine whether the patch data is chromatic or achromatic. The CPU 102 then calibrates the three-dimensional LUT for converting L*a*b* to CMY using the readings and reference values and outputs calibrated 3D-LUT. Here, the reference values refer to target L*a*b* values and each defined with chromatic and achromatic colors. The 3D-LUT for converting L*a*b* to CMY is a LUT for converting colors generated using known techniques, which is data describing CMY values specific to a device that corresponds to RGB or L*a*b* values defined at certain intervals in a grid-like manner. Any of the L*a*b* values are subject to interpolating operations and output as corresponding CMY values. Finally, the CPU 102 produces a 4D-LUT for converting from CMYK to CMYK using the 3D-LUT, the calibrated 3D-LUT, and device information and performs calibration operations with the 4D-LUT.

The term device information as used in this embodiment represents the amount of toner applicable by the image forming unit 20 and is referred to as "placement amount" herein. For example, for CMYK, if the maximum value of a single color is set to 100%, then theoretically a signal value of up to 400% could be set, while if the total of applicable toners is set to 300%, then the placement amount would also be 300%.

Figure 2:
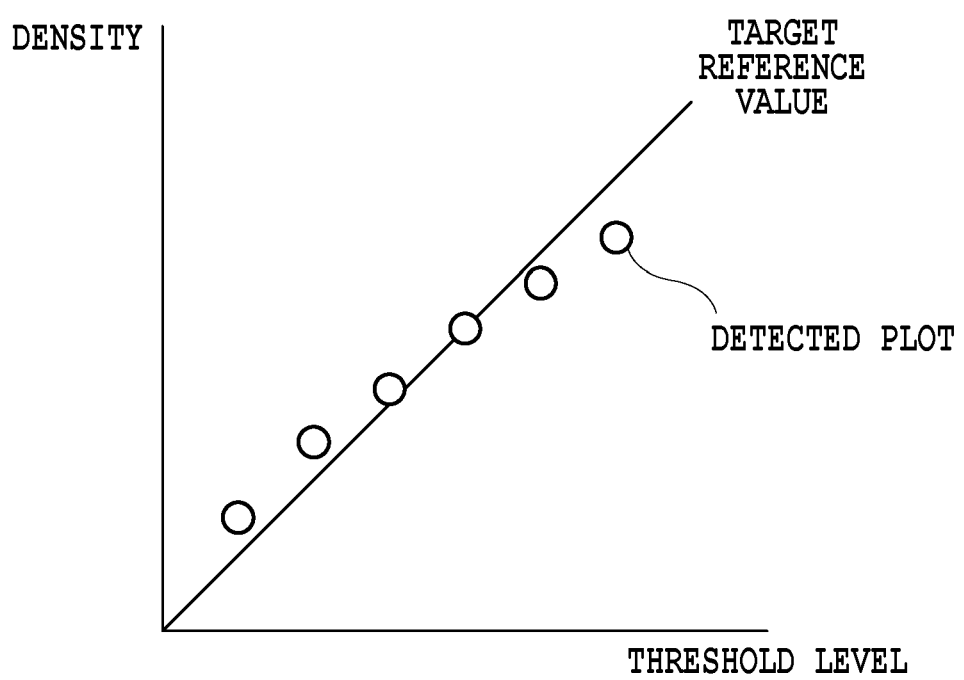
FIG. 2 is a graph illustrating changes in toner density during calibration processes in accordance with embodiments 1 and 2.
Figure 3:
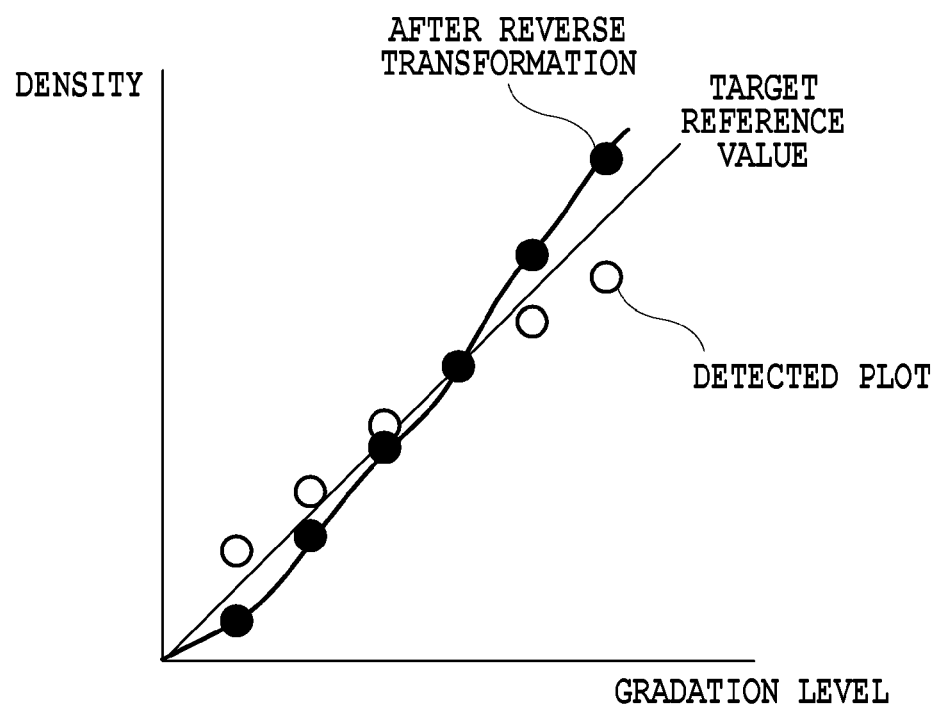
FIG. 3 is a graph illustrating the result of an inverse transformation process in a density calibration process in accordance with embodiments 1 and 2.

FIG. 2 shows density output characteristics indicating the changes in the toner image density obtained by reading output patch patterns. The CPU 102 uses the changes in received density, the density of a reference target, and detected plots as well as the device characteristics to perform reverse transformation such that output image density for image signals aligns linearly. FIG. 3 illustrates the result of the linear calibration of the densities plotted with the reverse transformation. Gamma LUTs stored in the half toning process units 407C, 407M, 407Y, and 407K will be corrected. It should be noted that the amount of calibration and changes in the density of toner images as well as basic density to be reflected to the gamma LUTs are generated preliminarily in the initial sequence after power activation, or on correcting density and color after a certain period. The gamma LUTs are generated on correcting density and color at predetermined timing and the calibration of the gamma LUTs is performed by comparing the gamma LUTs with read toner image density The foregoing processes allow for the calibration of density or color in the color image forming apparatus.

First Embodiment

An exemplary image forming system according to the above processes has the four color sensors 50*a, b, c*, and *d* arranged in parallel for reading in the main scanning direction a plurality of pattern densities on the recording medium 11. The reference plate is read by the color sensors 50*a, b, c*, and *d* on correcting density and color. Error operations performed when the difference between the reference plate's absolute values of chromaticity or density exceeds a predefined threshold will now be described with reference to the flowchart of FIG. 1.

The CPU 102 begins to correct density or color during startup, after returning from sleep, after a certain operation period, or after forming a certain number of images. At step S101, the color sensors 50*a, b, c*, and *d* notify the CPU 102 of results of measuring chromaticity or density of opposing reference plates 53*a, b, c*, and *d*. The flow then proceeds to step S102. At step S102, the CPU 102 compares the absolute values calculated from the results received at step S101 with the preliminarily stored absolute values of the reference plates 53*a, b, c*, and *d*. The flow then proceeds to step S103. At step S103, the CPU 102, after comparing at step S102, it is determined whether the difference between both absolute values is larger than the predefined threshold. If so, the CPU 102 determines that there exists abnormity and stores the characters assigned to the sensors 50, such as a, b, c, or d, that have determined as such. The flow then proceeds to step S105. If not, the CPU 102 determines that the color sensors are normal. The flow then proceeds to step S104.

At step S104, based on the difference obtained at step S102, the CPU 102 calibrates the outputs of the color sensors 50*a, b, c*, and *d* back to the absolute values of the reference plates 53*a, b, c*, and *d*, respectively. The flow then proceeds to step S105. At step S105, the CPU 102 determines whether all of the arranged color sensors 50*a, b, c*, and *d* have completed the above steps S101 to S104, and if so, the flow proceeds to step S106. If not, the CPU 102 returns to step S101 and repeats the above steps for the sensors that have not completed the steps S101 to S104. At step S106, it is determined whether there was abnormity at step S103 for any of color sensors 50*a, b, c*, and *d*, and if not, the flow proceeds to step S107; otherwise, it moves to step S110.

At step S107, the CPU 102 configures patch pattern generation units 409C, 409M, 409Y, and 409K to generate gray gradation patches of a plurality of predefined K gradation degrees and CMY-mixed process gray gradation patches. In this configuration, based on operations performed after previous calibration, pattern types are selected depending on the color, gradation and half toning process of patch patterns of which density or color is to be corrected. The CPU 102 also configures the timing adjustment units 410C, 410M, 410Y, and 410K to position the above patch patterns to be generated to the coordinates of the color sensors 50*a, b, c*, and *d* arranged in the main scanning direction, respectively. The CPU 102 further configures the timing adjustment units to output the patches in the vertical scanning direction according to the size of the paper. With the above configuration, the patches are printed and toner images are formed on the intermediate transferring body 28.

At step S108, after analog/digital conversion of signal values read from the toner images formed at step S107, the color sensors 50*a, b, c*, and *d* send the signal values to the CPU 102 of the controller 401 via the device interface 107. The CPU 102 extracts density from signal values read from the sensors placed at the coordinates at step S107. The flow then proceeds to step S109. At step S109, the CPU 102, as described above, produces a 4D-LUT for converting from CMYK to CMYK using the 3D-LUT, the converted 3D-LUT, and device information and performs color calibration. Additionally, the CPU 102 performs density calibration for the gamma LUTs to complete color or density calibration.

At step S110, the CPU 102 selects either of the recording medium 11*a, b, c*, or *d* from the feed trays 21*a, b, c*, or *d* and conveys it to the two-sided conveyor path 60 via the secondary transferring roller 29. Here, the recording medium is preferably selected such that the color sensors 50*a, b, c*, and *d* can stably read white colors from the medium. For example, a recording medium with low transparency and heavy basis weight (standard weight for papers or paperboards, defined as their weight per square meter) is generally selected. Alternatively, recording media may be selected that are other than highly reflective coated and colored paper or paper the users have preselected. Alternatively, recording media to be used for the next job may be selected and conveyed again from the two-sided conveyor path to the secondary transferring roller 29. After completing the selection of recording media, the flow proceeds to step S111.

At step S111, the color sensors 50*a, b, c*, and *d* read density on at least one of the coordinates on the surface of the recording medium 11 that was selected and selectively conveyed at step S110, and send the density to the CPU 102. The flow then proceeds to step S112. At step S112, the CPU 102 compares, among the results sent at step S111, readings of the sensors determined abnormal with that of the sensors determined normal. The flow then proceeds to step S113. At step S113, the CPU 102 determines whether the difference obtained from the comparison at step S112 is within the predetermined threshold. If so, the flow proceeds to step S118; otherwise, it moves to step S114.

Figure 8:
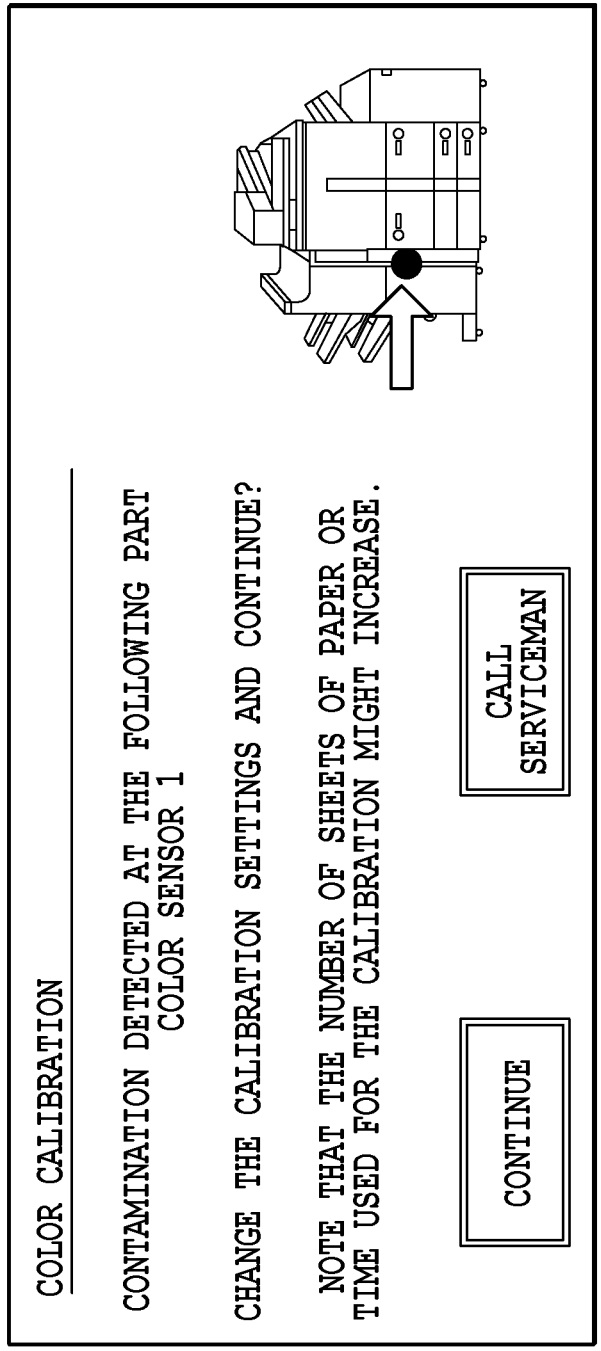
FIG. 8 is a diagram illustrating exemplary UI displays of an image forming apparatus in accordance with embodiments 1 and 2.

At step S114, the CPU 102 determines that the color sensor is abnormal which was determined so at step S103 and displays an abnormity alarm message on a UI as shown in FIG. 8 or send that message to the user via e-mail. Alternatively, the message may be sent to a serviceman via e-mail, for example. The flow then proceeds to step S115. When there are any other normal sensors, at step S115, the CPU 102 displays information about whether calibration (degenerate) process should be performed using only those sensors. If a user selected to perform the degenerate process, the flow then proceeds to step S116. Otherwise, the calibration process ends.

At step S116, the CPU 102 configures the degenerate process. Usually, patch patterns are generated such that they align uniformly on the recording medium 11 for the coordinates of the color sensors 50*a, b, c*, and *d*. The CPU 102; however, changes the sequence of patch patterns on the coordinates of abnormal color sensors detected at step S114 to be read by the other sensors. Here, the CPU 102 configures the patch pattern generation units 409C, 409M, 409Y, and 409K to switch the patch patterns around such that they are categorized in similar colors. Alternatively, the CPU 102 may configure the units to remove achromatic colors or single-color patch patterns other than those located outside the color space in order to reduce time or the number of recording medium. The flow then proceeds to step S117.

Figure 9:
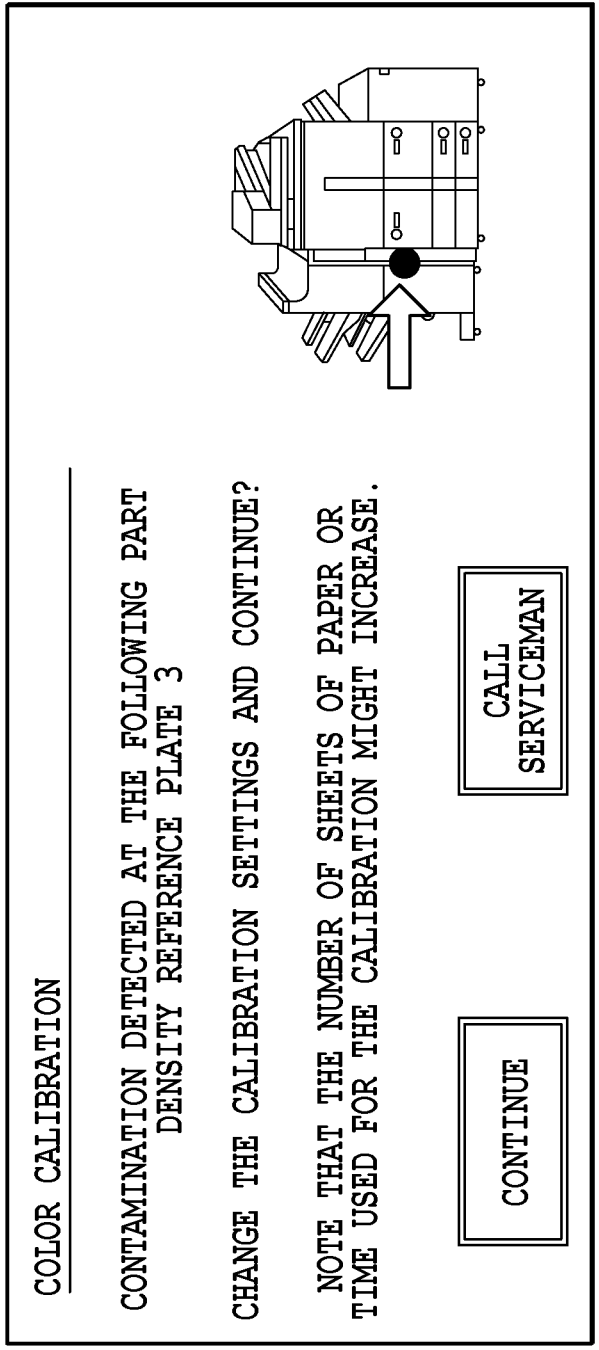
FIG. 9 is a diagram illustrating exemplary UI displays of an image forming apparatus in accordance with embodiments 1 and 2.

At step S117, the CPU 102 orders the image generation unit 404 to instruct patch pattern generation units 409C, 409M, 409Y, and 409K to generate patch patterns to form them on the recording medium 11. The flow then proceeds to step S108. At step S118, the CPU 102 determines that the reference plate 53 arranged in a manner opposing the color sensor is abnormal which was also determined abnormal at step S103 and displays an abnormity alarm message on a UI as shown in FIG. 9 or send that message to the user via e-mail. Alternatively, the message may be sent to a serviceman via e-mail, for example. The flow then proceeds to step S119.

At step S119, the CPU 102 asks the user whether to perform calibration in connection with other normal sensors since the abnormal color sensors are not subject to calibration at step S103. When the readings of the plurality of sensors determined normal at step S119 vary widely, the CPU 102 may determine that white colors of the recording medium is not appropriate for calibration and not select it to perform the calibration. If the user selects to execute the calibration, the flow proceeds to step S120. The flow proceeds to step S116 if the user selects not to execute the calibration, there is no normal sensors as determined at step S103, or the recording medium is determined not appropriate.

At step S120, the CPU 102 obtains, from the readings of the recording medium 11 read at step S111 and S112, the difference between the readings of abnormal and normal color sensors as determined at step S103. Using the difference, the CPU 102 sets coefficients for calibrating the readings of the abnormal color sensors into those of normal color sensors. The flow then proceeds to step S107.

The foregoing flow allows for the identification of error factors in either of abnormal sensors or reference plates on handling errors during calibration of density and color. Furthermore, more accurate calibration of density and color by color sensors can be accomplished when errors have occurred for the reference plate.

Second Embodiment

In the above image forming system, the four color sensors 50a, b, c, and d are arranged such that each of the sensors 50 can read corresponding opposing reference plates 53a, b, c, and d on calibrating density and color. The number of differences exceeding a predefined threshold between readings of each of the sensors 50 and the absolute values of the reference plates 53 is counted. Error handling procedures using the number will now be described with reference to the flowcharts in FIGS. 1 and 13 and the table in FIG. 12. As described in those figures, in this embodiment 2, detailed processes in addition to those described in embodiment 1 will be performed at steps S112 and S113 among steps in the flowchart in FIG. 1. As such, the description of the steps other than steps S112 and S113 will be omitted as it is similar to that in embodiment 1. At step S112, the detail of the process generally depends on the device status. Specifically, depending on the abnormity of the device, different values will be compared with the readings of the sensors at step S112. In other words, at step S112, the CPU 102 compares with any of the values described below the readings of the recording medium 11 which was read by any of the color sensors 50a, b, c, and d determined abnormal at step S103. The details of the comparison of the readings are illustrated in FIG. 13.

Figure 13:
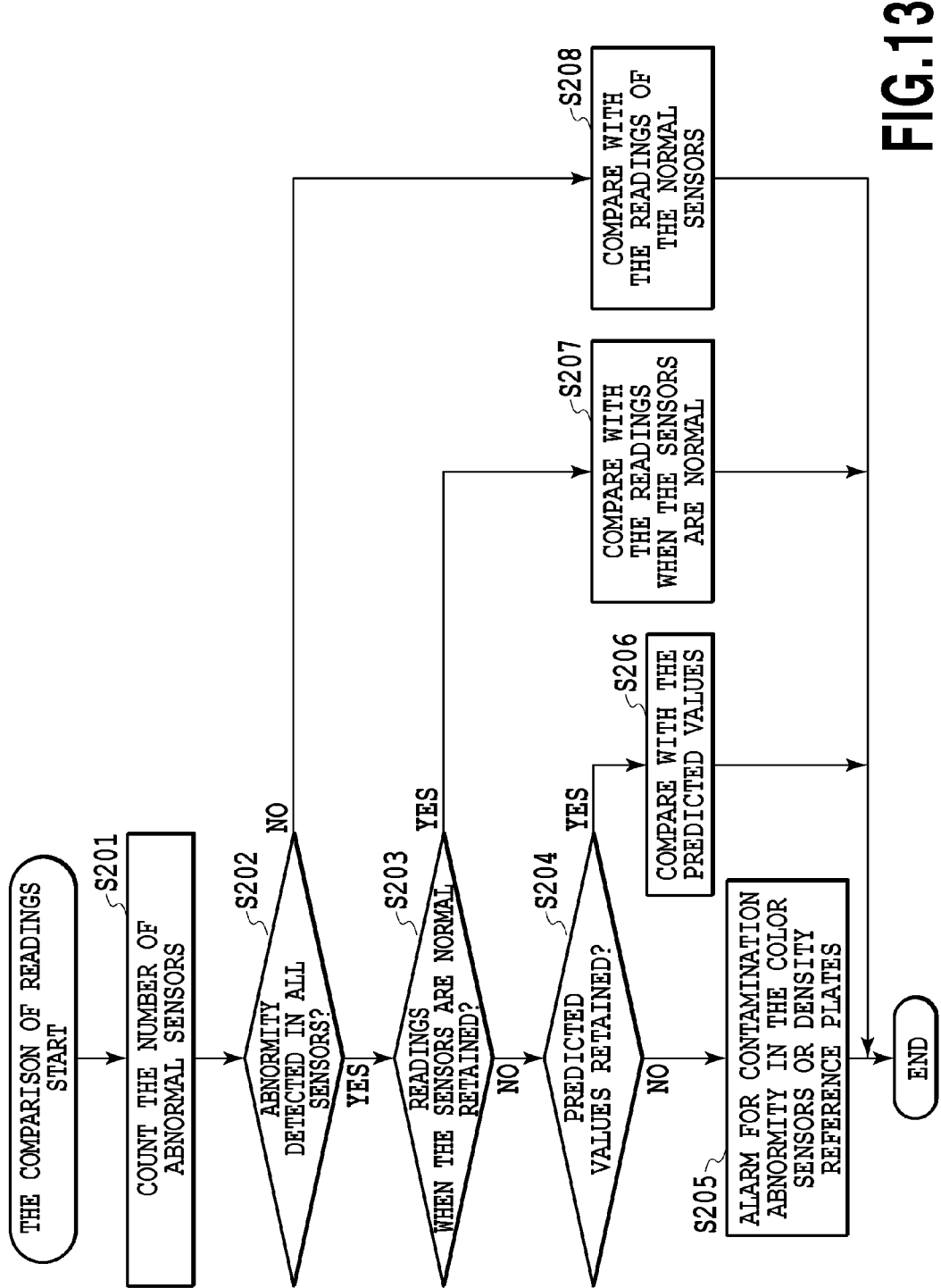
FIG. 13 is a flowchart illustrating an exemplary calibration process of density and color in accordance with embodiment 2.

With reference to FIG. 13, at step S201, the CPU 102 counts the number of color sensors determined abnormal at step S103. The flow then proceeds to step S202. At step S202, the CPU 102 compares the number counted at step S201 with the number of color sensors arranged. If they are equal, which is the case c, d, e, f, and g in the table of FIG. 12, then the flow proceeds to step S203; otherwise, it moves to step S208.

At step S203, the CPU 102 determines whether sensors which were determined normal on previous calibration of density and color retain the readings of the currently selected recording medium 11. If not, the flow proceeds to step S204; otherwise, it proceeds to step S207. At step 204, the CPU 102 determines whether the sensors retain predicted values preconfigured by the user or a serviceman. If it does not retain, the flow proceeds to step S205; otherwise, it proceeds to step S206.

If the predicted values are not configured, at step S205, the CPU 102 stops the calibration process and notifies an abnormity message indicating that either of the color sensors or the reference plates are contaminated and then ends the flow. At step S206, the CPU 102 compares the readings of the recording medium 11 read by the sensors with the predicted value and then ends the flow. At step S207, the CPU 102 compares the readings of the recording medium 11 read by the sensors with that when the sensors are normal and then ends the flow.

Figure 11:
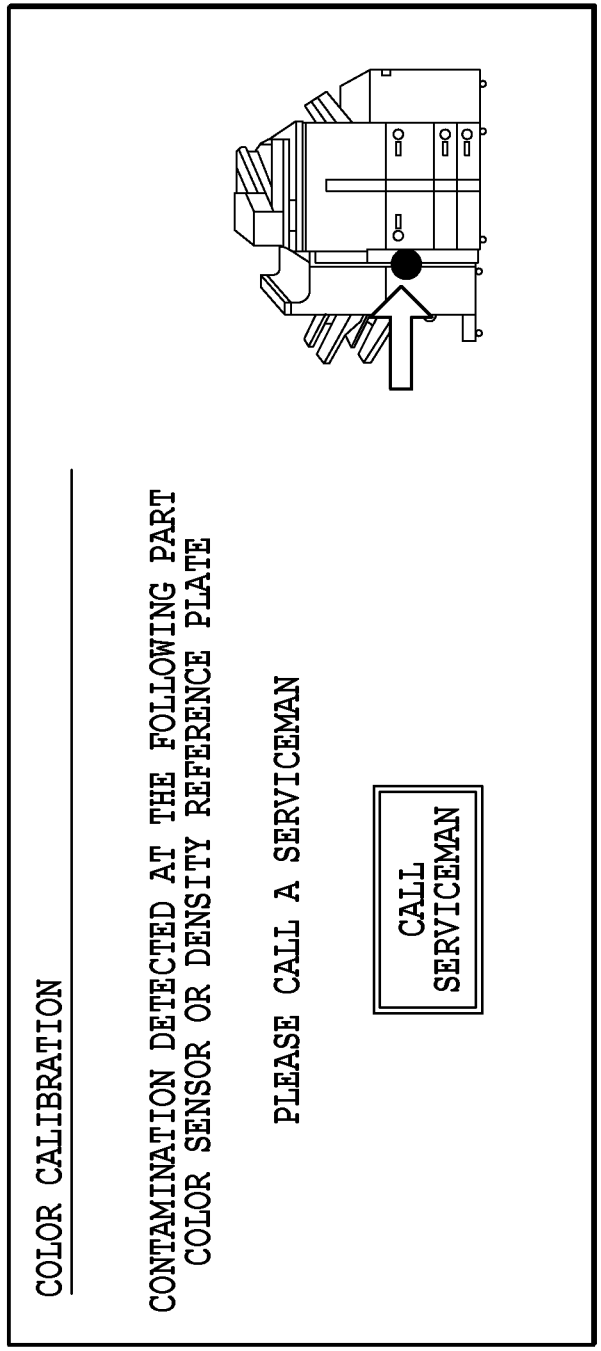
FIG. 11 is a diagram illustrating exemplary UI displays of an image forming apparatus in accordance with embodiments 1 and 2.

At step S208, the CPU 102 compares the readings read by the sensors determined abnormal at step S103 with that by the other sensors determined normal and then ends the flow. In this case, an abnormity alarm message will be displayed on a UI as shown in FIG. 11 or sent to the user via e-mail. Alternatively, the message may be sent to a serviceman via e-mail, for example.

As described above, the relationship between the number of color sensors arranged within the image forming apparatus and the number of sensors among the color sensors determined abnormal at step S103 gives a categorization table as illustrated in FIG. 12. Targets for comparison can be changed based on such relationships and whether the sensors retain any such target to be compared with readings stored within the sensors.

Figure 10:
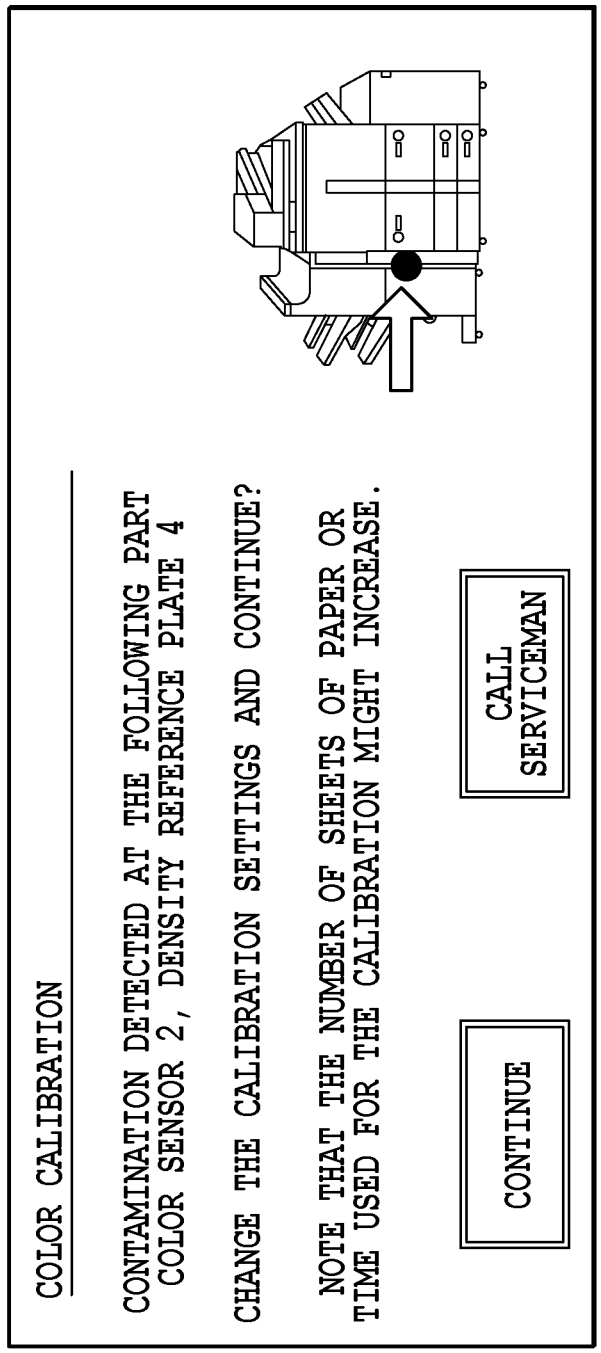
FIG. 10 is a diagram illustrating exemplary UI displays of an image forming apparatus in accordance with embodiments 1 and 2.

For example, in cases where a plurality of color sensors are arranged and the number of the plurality of color sensors and that of abnormal sensors is equal (i.e., the cases a, b, and c in FIG. 12), at step S112, the readings of the sensors will be compared with the readings when the sensors were normal or the predicted values. On the other hand, if the number of abnormal sensors is less than the total of color sensors arranged (i.e., the cases d, e, and f in FIG. 12), the CPU 102 preferentially selects the readings of the other normal sensors as targets for comparison. As a result, the CPU 102 can determine at step S113 whether the reference plates, the color sensors, or the both are contaminated. If the CPU determines that both are contaminated, then the abnormity alarm message will be displayed on the UI as shown in FIG. 10 or sent to the user via e-mail. Alternatively, the message may be sent to a serviceman via e-mail, for example. Both steps S118 and S114 would be performed in this case.

If only one color sensor is arranged, then the CPU 102 would select the retained readings of the sensors when they are normal or the predicted values as targets for comparison, as in the above description. If the comparison at step S113 results in the difference being within the predefined threshold (i.e., the case g in FIG. 12), the CPU 102 would determine that the reference plates are contaminated. The flow then proceeds to step S118. If the difference is not within the threshold (i.e., the case h in FIG. 12), the CPU 102 would determine that the color sensors are contaminated. The flow then proceeds to step SI14.

It should be noted that the readings of the recording medium 11 which the above normal sensors has read, and predicted values preconfigured by the user or serviceman are stored in a storage such as RAM 104 or external storage unit 106 and can be read from the storage as required.

The foregoing flow allows for the identification of error factors in either of abnormal sensors or reference plates on handling errors during calibration of density and color. Furthermore, more accurate calibration of density and color by color sensors can be accomplished when errors have occurred for the reference plate.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a plurality of color sensors;
a reference plate for adjusting output characteristics of the plurality of color sensors;
a reading means for causing a first color sensor of the plurality of color sensors and a second color sensor other than the first color sensor to read the density on a surface of a pre-selected kind of paper when, as a result of the first color sensor among the plurality of color sensors having obtained the readings of the reference plate, the difference between a predefined absolute value of the reference plate and readings of the reference plate read by the first color sensor is larger than a predefined threshold, and as a result of the second color sensor among the plurality of color sensors having obtained the readings of the reference plate, the difference between a predefined absolute value of the reference plate and readings of the reference plate read by the second color sensor is smaller than a predefined threshold; and
a determination means for determining that there exists abnormality in the reference plate when the difference between the readings of the paper read by the first color sensor and that read by the second color sensor is smaller than a predefined threshold and determining that there exists abnormality in the first color sensor when the difference between the readings of the paper read by the first color sensor and that read by the second color sensor is larger than a predetermined threshold; and
a notification means for notifying the determination result.

2. The image forming apparatus according to claim 1, wherein a kind of paper specified by a user is selected and conveyed as the pre-selected kind of paper.

3. The image forming apparatus according to claim 1, wherein a kind of paper with large basis weight is selected and conveyed as the pre-selected kind of paper.

4. The image forming apparatus according to claim 1, wherein the same kind of paper as a sheet of paper used for the next printing is selected and conveyed as the pre-selected kind of paper.

5. The image forming apparatus according to claim 1, wherein if, as a result of all of the plurality of color sensors having obtained the readings of the reference plate, the differences between predefined absolute value of the reference plate and the readings are larger than a predefined threshold, the determination means performs the determination based on the difference between the readings of the paper by the first color sensor and predefined predicted values.

6. The image forming apparatus according to claim 1, wherein
the readings of the reference plate read by the first color sensor is retained, and
if, as the result of all of the plurality of color sensors having obtained the readings of the reference plate, the differences between predefined absolute value of the reference plate and the readings are larger than a predefined threshold, the determination means performs the determination based on the difference between the readings of the paper by the first color sensor and the retained readings.

7. The image forming apparatus according to claim 1, wherein if, as the result of having obtained the readings of the reference plate, the differences between the absolute value and the readings are smaller than a predefined threshold, the first color sensor is calibrated such that the readings comes close to the absolute value.

8. The image forming apparatus according to claim 1, wherein
the first color sensor adjusts its output characteristic using a first reference plate corresponding to the first color sensor,
the second color sensor adjusts its output characteristic using a second reference plate corresponding to the second color sensor, and
if the first reference plate is determined abnormal, the first color sensor is calibrated using a coefficient obtained from the readings of the paper read by the first and second color sensor.

9. The image forming apparatus according to claim 1, further comprising a calibrating means for calibrating using the color sensor, and wherein if the reference plate is determined abnormal and there exists no other color sensors determined normal, it is notified that the calibrating means cannot execute calibration.

10. The image forming apparatus according to claim 1, further comprising a calibrating means for calibrating using the color sensor, and wherein if the first color sensor is determined abnormal, the calibrating means executes calibration using only the other sensors determined normal.

11. The image forming apparatus according to claim 1, further comprising a calibrating means for calibrating using the color sensor, and wherein if the first color sensor is determined abnormal and there exists no other color sensors determined normal, it is notified that the calibrating means cannot execute calibration.

12. A method for controlling an image forming apparatus having a plurality of color sensors and a reference plate referenced for adjusting output characteristics of the plurality of color sensors, the method comprising steps of:

having a first color sensor of the plurality of color sensors and a second color sensor other than the first color sensor read the density on a surface of a pre-selected kind of paper when, as a result of the first color sensor among the plurality of color sensors having obtained the readings of the reference plate, the difference between a predefined absolute value of the reference plate and readings of the reference plate read by the first color sensor is larger than a predefined threshold, and as a result of the second color sensor among the plurality of color sensors having obtained the readings of the reference plate, the difference between a predefined absolute value of the reference plate and readings of the reference plate read by the second color sensor is smaller than a predefined threshold; and determining that there exists abnormality in the reference plate when the difference between the readings of the paper read by the first color sensor and that read by the second color sensor is smaller than a predefined threshold and determining that there exits abnormality in the first color sensor when the difference between the readings of the paper read by the first color sensor and that read by the second color sensor is larger than a predetermined threshold; and notifying the determination result.

* * * * *